United States Patent
Dooley et al.

(10) Patent No.: US 9,495,298 B2
(45) Date of Patent: Nov. 15, 2016

(54) CACHE LINE CROSSING LOAD TECHNIQUES

(71) Applicant: INTERNATIONAL BUSINESS MACHINES CORPORATION, Armonk, NY (US)

(72) Inventors: Miles R. Dooley, Austin, TX (US); David A. Hrusecky, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/734,784

(22) Filed: Jun. 9, 2015

(65) Prior Publication Data

US 2016/0026572 A1  Jan. 28, 2016

Related U.S. Application Data

(63) Continuation of application No. 14/337,361, filed on Jul. 22, 2014.

(51) Int. Cl.
*G06F 12/08* (2016.01)
*G06F 12/12* (2016.01)

(52) U.S. Cl.
CPC ....... *G06F 12/0862* (2013.01); *G06F 12/0811* (2013.01); *G06F 12/0875* (2013.01); *G06F 12/128* (2013.01); *G06F 12/12* (2013.01); G06F 2212/1024 (2013.01); G06F 2212/283 (2013.01); G06F 2212/452 (2013.01); G06F 2212/602 (2013.01); G06F 2212/6026 (2013.01); G06F 2212/6028 (2013.01); G06F 2212/69 (2013.01)

(58) Field of Classification Search
CPC ............. G06F 9/3816; G06F 9/3824; G06F 9/30043; G06F 12/0862; G06F 12/0886; G06F 2212/602

See application file for complete search history.

(56) References Cited

U.S. PATENT DOCUMENTS

| | | | |
|---|---|---|---|
| 5,386,531 A | 1/1995 | Blaner et al. | |
| 5,414,824 A | 5/1995 | Grochowski | |
| 6,226,707 B1 | 5/2001 | Mattela et al. | |
| 6,581,131 B2 | 6/2003 | Vondran, Jr. | |
| 7,337,272 B2 | 2/2008 | Morrow | |
| 7,404,042 B2 | 7/2008 | Stempel et al. | |
| 8,086,801 B2 | 12/2011 | Hrusecky et al. | |
| 2009/0119485 A1* | 5/2009 | Smith | G06F 9/30152 712/205 |

(Continued)

OTHER PUBLICATIONS

Dooley et al., "Cache Line Crossing Load Techniques for a Caching System", U.S. Appl. No. 14/337,361, Non-Final Office Action dated Mar. 31, 2016.

(Continued)

*Primary Examiner* — Gary W Cygiel
(74) *Attorney, Agent, or Firm* — Michael R. Long; Steven L. Bennett

(57) ABSTRACT

A technique for handling an unaligned load operation includes detecting a cache line crossing load operation that is associated with a first cache line and a second cache line. In response to an cache including the first cache line but not including the second cache line, the second cache line is reloaded into the cache in a same set as the first cache line. In response to reloading the second cache line in the cache, a cache line crossing link indicator associated with the first cache line is asserted to indicate that both the first and second cache lines include portions of a desired data element.

6 Claims, 6 Drawing Sheets

(56) References Cited

U.S. PATENT DOCUMENTS

2012/0254540 A1* 10/2012 Kou .................... G06F 12/0862
                                                        711/122
2013/0013862 A1* 1/2013 Kannan ................ A61B 5/0538
                                                        711/119

OTHER PUBLICATIONS

Dooley et al., "Cache Line Crossing Load Techniques for a Caching System", U.S. Appl. No. 14/337,361, Notice of Allowance dated Jul. 19, 2016.

* cited by examiner

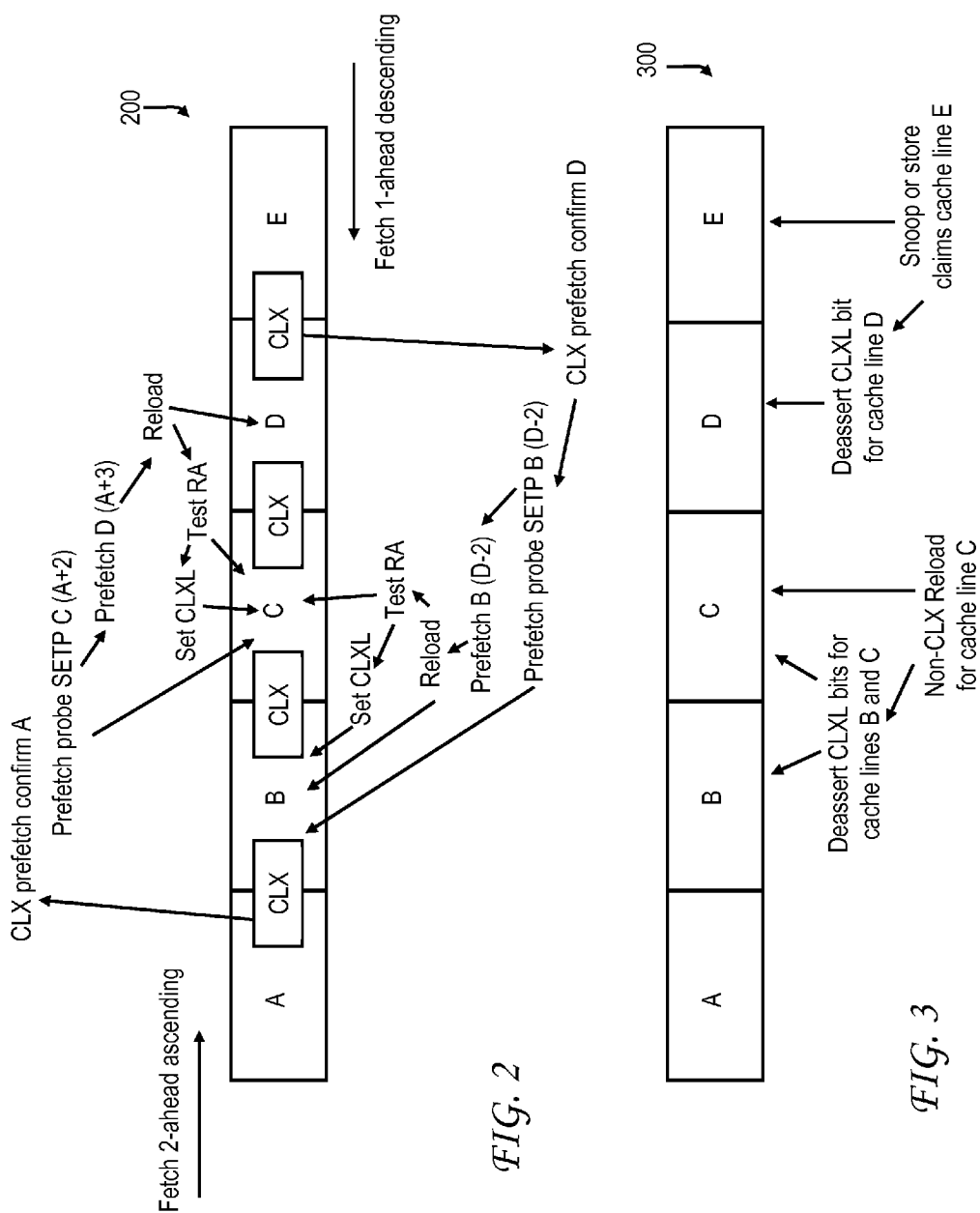

CACHE LINE CROSSING LOAD TECHNIQUES

This application is a continuation of U.S. patent application Ser. No. 14/337,361 entitled "CACHE LINE CROSSING LOAD TECHNIQUES FOR A CACHING SYSTEM," filed Jul. 22, 2014, the disclosure of which is incorporated herein by reference in its entirety for all purposes.

BACKGROUND

The disclosure generally relates to load techniques for a caching system, and more particularly, to cache line crossing load techniques for a caching system.

Cache lines may be reloaded into a cache in response to a demand load or a prefetch. Data prefetch (cache management) instructions, which have typically used direct addressing, have been employed to move data into a cache before the data is accessed in an attempt to minimize cache-miss latency. Data prefetch instructions (which may be added to software by a compiler or programmer) are generally treated as hints, which affect software performance but not software functionality. Hints can be used to move data into a given cache level in an attempt to provide a desired performance. Prefetched data in a same cache line as desired data has spatial locality and has a high probability of being accessed in the near future. Data with temporal locality, or persistence, is expected to be accessed multiple times and should generally be maintained in a cache for ready accessibility. Accesses to data with no temporal locality is transient and, as such, data with no temporal locality should generally be removed from a cache after use to provide room in the cache for other data.

Some data prefetch instructions allow for specifying a cache level in which data should be stored. Various data prefetch instructions make a distinction between memory which is expected to be read and memory which is expected to be written. When data is to be written, a data prefetch instruction usually moves a data block into a cache so that an expected store is to the cache. A prefetch for a write generally brings data into a cache in an exclusive or modified state. A prefetch for data to be written can usually be replaced with a prefetch for data to be read (this is usually how implementations that define both kinds of instructions, but do not support prefetch for writes, operate). A data block accessed by a data prefetch instruction usually corresponds to a cache line, whose size is implementation-specific. Various architectures implement data prefetch instructions with a base update form, which modifies a prefetch address following a prefetch. Base update (pre/post increment/decrement) is also supported on load and store instructions for some architectures and can be taken into consideration in code that uses data prefetch instructions.

Some architectures implement data prefetch instructions that cause faults when the address to prefetch is invalid or not cacheable. In general, data should be stored in a cache prior to being accessed. However, using prefetches that are too speculative can have negative affects as there are costs associated with data prefetch instructions. Similarly, prefetching data that is already in the cache increases overhead without providing any benefit. For example, data may already be in a cache when the data is in the same cache line as data already prefetched (spatial locality) or if the data has been used recently (temporal locality). Some architectures recognize data prefetch instructions but treat them as no operation (nop) instructions. Usually, data prefetch instructions are ignored for memory pages that are not cacheable. However, a base address of a data prefetch instruction that has a base update form may be updated even if addressed memory cannot be prefetched.

BRIEF SUMMARY

A technique for handling an unaligned load operation includes detecting a cache line crossing load operation that is associated with a first cache line and a second cache line. In response to a cache including the first cache line but not including the second cache line, the second cache line is reloaded into the cache in a same set as the first cache line. In response to reloading the second cache line into the cache, a cache line crossing link indicator associated with the first cache line is asserted to indicate that both the first and second cache lines include portions of a desired data element.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 2 is a diagram of a relevant portion of several exemplary cache lines that illustrates various aspects of cache line crossing load techniques according to an embodiment of the present disclosure;

FIG. 3 is a diagram of a relevant portion of several exemplary cache lines that illustrate other aspects of cache line crossing load techniques according to another embodiment of the present disclosure;

DETAILED DESCRIPTION

Figure 1:
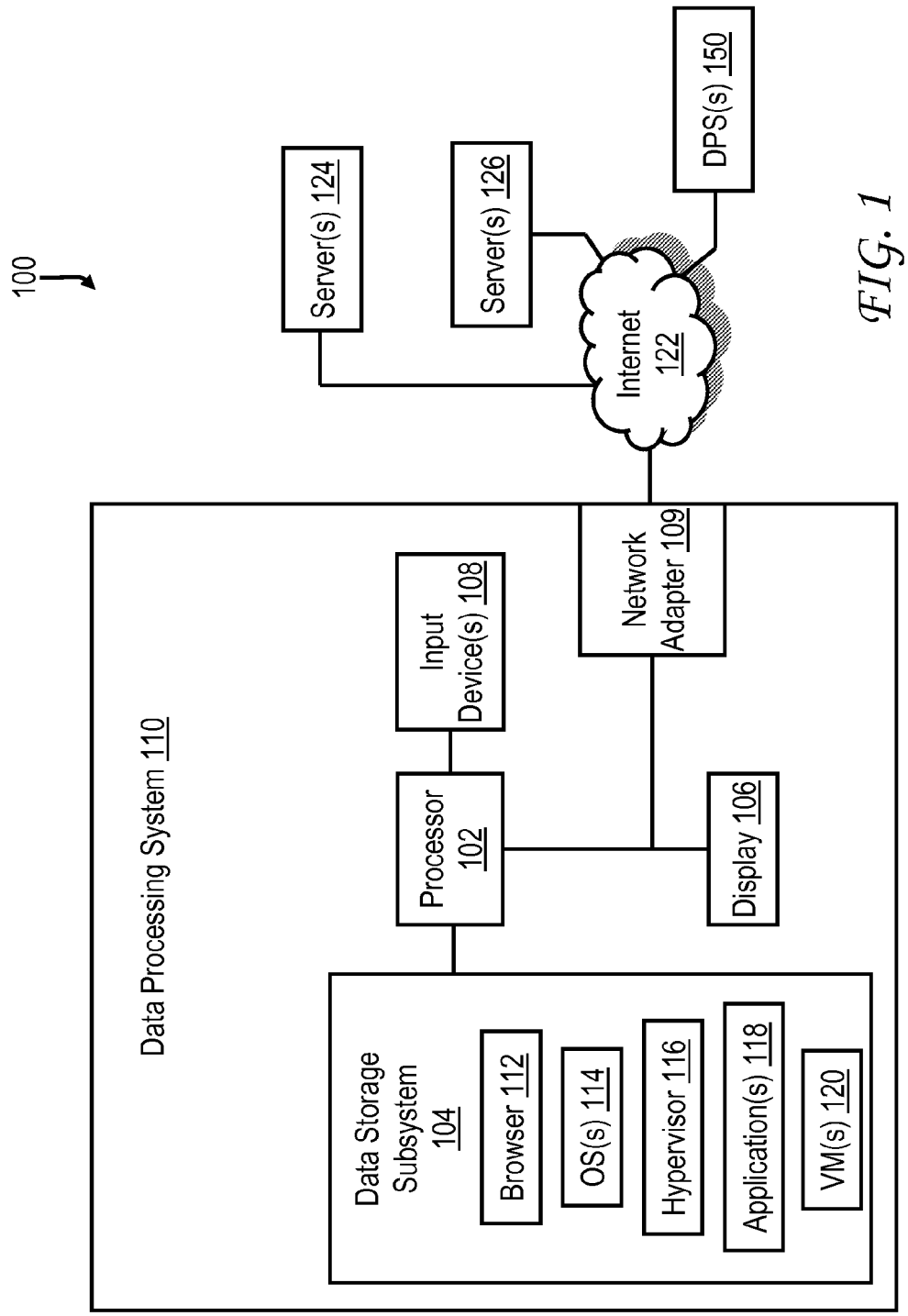
FIG. 1 is a diagram of a relevant portion of an exemplary data processing system environment that includes a data processing system that is configured to implement cache line crossing load techniques according to the present disclosure.

The illustrative embodiments provide a method, a data processing system, and a processor configured to implement cache line crossing load techniques for a caching system according to the present disclosure.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements.

While the discussion herein is directed to implementing cache line crossing load techniques in a level 1 (L1) cache, it is contemplated that the disclosed cache line crossing load techniques may be implemented in other cache levels of a hierarchical cache system. Moreover, while the discussion herein focuses on cache line crossings, it is contemplated that the disclosed techniques may find general applicability to data block crossings, where the data blocks include multiple cache lines. Furthermore, while the discussion herein focuses on data stored in a data cache, it is contemplated that the disclosed techniques are applicable to shared data and instruction caches.

Modern computer systems typically include multiple levels of cache memory (cache) that store data usable by instructions issued from a central processing unit (CPU) or processor core. The highest level of cache, referred to as level 1 (L1) cache (as contrasted with lower cache levels, e.g., level 2 (L2) cache, level 3 (L3) cache, etc.) is the cache level where instructions that require data from memory can directly access the data. Cache systems are usually built in a pyramidal fashion, with the smallest and fastest cache corresponding to the L1 cache and subsequent lower levels of cache being larger and slower than a previous level of cache. The ability to ensure that an instruction seeking data can locate the data in an associated L1 cache may be one the most important factors in overall performance of a computer system. Various complex and high-speed mechanisms have been employed in cache systems to ensure that desired data is available in an L1 cache prior to the data being needed. In general, even relatively large expenditures in cache system design pay-off in terms of overall price/performance of a computer system.

During typical computer system operation, data is shuttled into and out of an L1 cache, frequently speculatively in hopes of meeting future data needs of subsequent instructions. In general, the movement of data into and out of an L1 cache is managed in discrete data blocks, e.g., cache lines. While the discussion herein focuses on 128-byte cache lines, it should be appreciated that cache line sizes in modern computer systems typically range between 64 to 512 bytes (in sizes that are based on a power of 2). While many programs are designed to store and seek data from databases that are aligned to a natural boundary (e.g., word-sized data may be stored on a word address boundary), databases that store unaligned data are becoming increasingly common with the advent of computer databases that are prolific in the fabric of human experience. As such, it is now common for data elements of a database to straddle a cache line boundary.

It should be appreciated that it is inherently easier to store and seek data in a naturally aligned database, as any action hardware performs to process any one data element only involves the use of a single cache line. When a cache line is accessed, multiple mechanisms are usually employed to read data out of an L1 cache and select (using, for example, complex high-speed set prediction mechanisms) which set from among multiple associativity classes may possibly hold desired data. Inherent in the access of a cache line is a directory mechanism that manages validity of accessed data, as well as an effective-to-real address translation (ERAT) mechanism that further ensures the correct data is accessed. Given the high-cost of such mechanisms, a design that features accessing two cache lines in parallel with the mechanisms may result in a cost that is too high for the typical computer system when, for example, the dual access is only realized if a cache line boundary is actually crossed. However, as greater burden is placed on computer systems that process data (as contrasted with humans that develop the data), the ability to process data elements that cross a cache line boundary in an efficient and fast manner is an increasingly important metric to achieve robust computer system designs.

According to the present disclosure, a cache system is disclosed that processes the seeking of data elements that cross a cache line boundary in a L1 cache in a relatively fast and efficient manner. Conventionally, one way to handle a cache line crossing (CLX) load has included stopping or interrupting normal pipelined processing and engaging a back-up system of instructions to breakdown a CLX load into two discrete accesses (where a boundary between cache lines corresponds to a boundary of the two accesses). In the event of a CLX load, data has been accessed and assembled in a target register using, for example, microcode. In general, using microcode is one of the slowest ways to produce a result. However, given that microcode is typically utilized to perform functions that are too expensive for a pipelined system to handle in hardware, using microcode to handle a CLX load has been considered to be fairly efficient. Moreover, using microcode to handle a CLX load has been the standard for many older computer systems.

Other conventional computer systems have attempted to handle a CLX load without employing microcode. In computer systems that have handled a CLX load without employing microcode (i.e., using the non-microcode approach), upon realizing that the computer system was attempting to handle a CLX load a first cache line in an L1 cache was processed during a time slot allotted for the CLX load. After placing data from the first cache line in a temporary buffer space, the computer system broke into a normal instruction flow to steal a cycle for use by a CLX process that attempted to extract data in the L1 cache from a second cache line. For such computer systems that do not employ microcode, latency can be quite low and the non-microcode approach is considered efficient given that the second cache line access reuses the same mechanisms that were employed to access the first cache line. One of the largest hardware expenses for the non-microcode approach is attributable to data buffer size multiplied by the number of cycles that it takes to recycle the CLX multiplied by the number of parallel pipes that require simultaneous use of the mechanism. With data element size approaching 64-bytes to feed data-hungry vector processing units, the non-microcode approach is relatively expensive in terms of hardware expenditures. Also, the stolen cycle from normal instruction flow that has been carefully setup by a processor core in the non-microcode approach can cause problems in an instruction completion scheme, which is another metric that is carefully designed in high-speed computer systems.

According to the present disclosure, techniques are disclosed for handling a CLX load without the typical interruptions and/or inefficiencies described above in the conventional approaches and without over-expenditure of hardware to 'brute force' the problem. L1 cache designs for many years have placed a high premium on the ability to access unaligned data from within a cache line. As such, cache designs that are configured to handle two different addresses (e.g., a first address that is a standard starting address and an unaligned second address that is the result of a high-speed conditional increment/decrement of the first address) are relatively common. In such cache designs, storage substructures of an L1 cache are organized with some structures using the standard address and other structures using the incremented/decremented address. When an unaligned data element is accessed, both a standard address structure and an incremented/decremented address structure contribute a portion of the data to produce the unaligned data element.

While it is common for an unaligned access within a cache line to extend beyond the artificial boundaries of a cache line (from a point-of-view of an L1 cache), conventionally unaligned access has required multiple accesses to prediction and directory structures to validate data accessed in two different cache lines. The various disclosed techniques for unaligned access do not require multiple accesses to an effective-to-real translation (ERAT) mechanism to access two different cache lines. According to the present disclosure, the fact that two adjacent cache lines are both usually within a same translation page (i.e., two different cache lines usually have the same high-order address) is exploited.

According to various embodiments, when an ERAT is accessed for a first cache line the ERAT is also accessed for a second cache line in a same cycle. An assumption may be made that both of the cache lines are present in the L1 cache at CLX access. In various embodiments, two cache lines that collectively include a desired data element are linked at reload time, i.e., the time when one or more of the cache lines are installed in the L1 cache after fetching from, for example, an L2 cache or an L3 cache. In one or more embodiments, when a second cache line is fetched due to an unaligned load miss, the second cache line is installed in the L1 cache (in a same set as an associated first cache line), and the first cache line is marked with a 'cache line crossing link' (CLXL) indicator (e.g., an associated CLXL bit is asserted) to indicate that the second cache line has been installed in the same set as the first cache line and, in this manner, the first cache line is linked to the second cache line.

While fetching a second cache line due to an unaligned load miss (i.e., a CLX load miss) for a first cache line and marking the first cache line to link the first cache line to the second cache line may be optimal with respect to the replacement policy for an associated prefetch stream (stream), doing so may be detrimental to other streams/threads that are simultaneously operating in the same L1 cache. As such, according to one embodiment, a second cache line is only linked with a first cache line when an unaligned load miss occurs for the second cache line in the event that linking the first and second cache lines is less than optimal for an overall replacement policy.

According to one embodiment, when performing an unaligned load with a load hit to the first cache line, if the CLXL bit is asserted for the first cache line a hit for a second cache line (that includes a portion of the data for an unaligned data element) is assumed. In a typical design, an L1 cache is already configured with an unaligned access mechanism (e.g., a conditional increment/decrement address mechanism) to retrieve a second cache line. According to one embodiment of the present disclosure, a carry propagate of a conditional increment/decrement address is extended to a most significant byte (MSB) of an address range of the L1 cache. It should be appreciated that a CLXL bit is not needed to extract data from the L1 cache. That is, the CLXL bit is merely utilized to control the acknowledgement of the validity of the access, where a load-store unit (LSU) responds to the processor core that the load access was successful and does not need to be retried (e.g., via a second sequential access or a flush to microcode).

According to one aspect of the present disclosure, a CLXL bit is established for a cache line at reload time. CLXL bit establishment may be performed by, for example, a prefetching unit (which is a typical feature of LSUs in a high-speed computer system). According to one aspect, a prefetch unit is used to cross link cache lines in an L1 cache. The direction of unaligned code (i.e., ascending or descending) may be determined by legacy logic in the prefetch unit, and a CLXL bit may be established irrespective of stream direction. According to the present disclosure, logic in a prefetch unit samples a set prediction hit (SETPhit) way (SETPhit-way) at stream allocation, and if there was a SETPhit, directs a reload control unit to use a set hit (i.e., the way that was hit) for reloading data. In response to a set prediction miss (SETPmiss) at stream allocation, the prefetch unit directs a reload control unit to use a set provided by a replacement policy unit for reloading data. The reload process, which may include data directory alias checking, is extended to ensure that a cache line to be linked to a reloading cache line is still present in the L1 cache.

According to the present disclosure, when an unaligned (i.e., a cache line crossing (CLX)) demand load is encountered, a determination is made as to whether an L1 hit or an L1 miss occurred for a first cache line. If the access to the first cache line resulted in a miss in the L1 cache, microcode may be employed to handle the first cache line miss. In this case, after the microcode has run, both the first cache line and a second cache line (that includes partial data for an unaligned data element) are established in the L1 cache. When the unaligned stream retries the CLX load, a hit will occur for both the first and second cache lines, as contrasted with a miss. It should be appreciated that the second cache line is not yet linked to the first cache line, as the CLX was handled by microcode. The prefetch unit is configured to detect a CLX load and allocate or confirm a CLX stream. The prefetch unit may determine a stream direction (i.e., ascending or descending) in a conventional manner. The prefetch unit shares the stream direction information with the reload control unit, which is responsible for fetching the data from a lower level cache for prefetches and demand loads. The prefetch unit may also prefetch cache lines to the L1 cache that will be encountered in a subsequent CLX access.

For ascending addresses, the prefetch unit may fetch and reload the CLX cache line+2 (i.e., perform '2-ahead' prefetching). For descending addresses, the prefetch unit may fetch and reload the CLX cache line−1 (i.e., perform '1-ahead' prefetching). It should be appreciated that different prefetch steps may be employed (e.g., 3-ahead prefetching for ascending addresses and 2-ahead prefetching for descending addresses). In a typical high-speed computer system two or three cache lines may, for example, be fetched ahead by the prefetch unit to keep the L1 cache fresh and ready when a CLX demand load instruction arrives at the LSU.

According to one or more embodiments, a 'prefetch probe', which is utilized to check for a directory hit, functions uniquely for the disclosed CLX processes (as compared to a conventional prefetch). For example, assuming a 2-ahead cache line prefetch and a set prediction mechanism that produces a set prediction hit (SETPhit) slot to select a proper associativity class, for an ascending address a CLX demand load is (D/D+1). In this case, for a 2-ahead sequence cache line 'D+3' is prefetched. A prefetch probe is then initiated on cache line 'D+2'. If SETPhit and an associated CLXL bit is asserted for the cache line 'D+2', the prefetch of the cache line 'D+3' is not required, as the cache line 'D+3' is already in the L1 cache. If SETPhit and the associated CLXL bit is not asserted, the cache line 'D+3' is prefetched, and the SETPhit value is recorded and used to determine the reload slot (i.e., to select which way to store the reloaded data in the L1 cache). The cache line 'D+2' and the cache line 'D+3' are then linked when the cache line 'D+3' is reloaded.

If SETPhit is not asserted, the cache line 'D+3' is prefetched, and a set provided by the replacement policy unit is used to determine the reload slot. In this case, the cache line 'D+2' and the cache line 'D+3' are not linked when cache line 'D+3' is reloaded (a CLXL between the cache line 'D+3' and cache line 'D+4' may be established when the cache line 'D+4' is prefetched). It should be appreciated that the reason that the cache line 'D+2' and the cache line 'D+3' are not linked when the cache line 'D+3' is reloaded and SETPhit is not asserted is that the cache line 'D+2' is not stored in the L1 cache. When the cache line 'D+3' is fetched a new string of soon-to-be-linked cache lines is initiated with an initial link being initiated when the cache line 'D+4' is prefetched. It should also be appreciated that demand loads will experience a break in prefetched cache line continuity at the cache line 'D+2' when SETPhit is not asserted.

For a descending address a CLX demand load is (D/D−1). For a 1-ahead prefetch sequence cache line 'D−2' is prefetched. In one or more embodiments, in contrast with ascending addresses, the SETPhit value is stored if a CLXL bit is asserted, and the SETPhit value becomes the defacto reload slot for future prefetches for descending addresses. A prefetch probe test is performed on cache line 'D−1'. If SETPhit and an associated CLXL bit is asserted for cache line 'D' the prefetch is complete (as the cache line 'D−1' is already present in the L1 cache). If SETPhit and the associated CLXL bit is not asserted, cache line 'D−2' is prefetched, and the set indicated by SETPhit is used as the defacto reload slot by the reload control unit. In various embodiments, the CLXL bit is tested at reload time. If SETPhit is not asserted for a set, cache line 'D−2' is prefetched, and the replacement policy unit provides the set for the reload slot.

When cache line 'R' is reloaded, for an ascending address the logic responsible for protecting against a reload alias cache line examines the directory for cache line 'R−1' (e.g., on a new directory read port). The logic utilizes the reload slot established at prefetch probe time to multiplex down the possible associativity class choices to readout a single real address (RA). The logic performs a test for RA(R−1)−RA(R)=−128. If the test is true, the CLXL bit for the 'R−1' cache line is asserted. If the test is false, the CLXL bit for the 'R−1' cache line is deasserted.

For a descending address the logic examines the directory for cache line 'R+1' (e.g., on a new directory read port). The logic then utilizes a reload slot established at prefetch probe time to readout a single RA. The logic then tests RA(R+1)−RA(R)=+128. If the test is true, the CLXL bit associated with cache line 'R' is asserted. If the test is false, the CLXL bit is deasserted for the cache line 'R'. If any other reload occurs that is not due to a CLX load miss following the above process, then the CLXL bits for associated cache lines are deasserted. In other words, a non-CLX prefetched cache line causes the CLXL bit for the cache line 'R' and for cache line 'R−1' to be deasserted (reset). It should be appreciated that a non-CLX reload can be modified to use a check that is similar to the check for a CLX reload, with an appropriate check chosen depending on whether the reload is a non-CLX reload or a CLX reload. For an ascending address or a descending address for a non-CLX reload the CLXL bit for the cache line 'R' is reset, as information on the relationship between the cache lines 'R' and 'R+1' or 'R' and 'R−1' is unavailable. In various embodiments, a snoop to the cache line 'R' causes a reset of the CLXL bit for the cache line 'R−1'.

Aspects of the disclosed techniques may be implemented in various hardware. For example, a directory annex to a reloading read port with a SETPhit multiplexer to read-out a linking (or linked) RA, so that the RA can be matched to a reloading 'RA' (+/−128), may be implemented. Reloading logic in a reload control unit may implement an adder (e.g., a 45-bit adder) to compare RAs (+/−128) for two cache lines. It should be appreciated that prefetch and reload control unit pipes may include additional controls to allow CLX, SET-Phits, and stream direction to pass through. In various embodiments, a CLXL bit for each cache line is implemented. The CLXL bit may be logically associated with a set prediction mechanism, but implemented outside a set prediction array such that a CLXL bit can be readily reset without disrupting a primary function (i.e., high-speed load set prediction) of the set prediction mechanism.

With reference to FIG. 1, an exemplary data processing environment 100 is illustrated that includes a data processing system 110 that is configured, according to one or more embodiments of the present disclosure, to cross link cache lines (that include a data element that crosses a cache line boundary) when a cache line crossing (CLX) load is detected. Data processing system 110 may take various forms, such as workstations, laptop computer systems, notebook computer systems, desktop computer systems or servers and/or clusters thereof. Data processing system 110 includes one or more processors 102 (which may be chip multiprocessors (CMPs) that include one or more processor cores for executing program code, with each processor core having an associated L1 cache) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives. For example, data storage subsystem 104 may include L2 and L3 cache and main memory.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Instruction set architecture (ISA) support for data prefetching may be implemented by a data prefetch instruction (e.g., a load instruction). In general, programs are written using effective addresses (EAs), while caches and main memory are accessed utilizing real addresses (RAs). As such, address translation is required to convert the EAs (used by software) to RAs (used by hardware). For example, in various POWER™ architectures a segment table (located in a segment lookaside buffer (SLB)) and hashed page table (located in a translation lookaside buffer (TLB)) have been employed to translate EAs (used by software) into a virtual address (VA) and then into RAs (used by hardware) to locate data in storage. After translation, an EA and RA pair may be stored in an effective-to-real address translation (ERAT) unit to reduce latency associated with accessing data in storage. In general, an ERAT table (stored in the ERAT unit) may be accessed (indexed) using an EA associated with a data prefetch instruction. It should be appreciated that the techniques disclosed herein are equally applicable to architectures that convert an EA to an RA without first converting the EA into a virtual address (VA).

With reference to FIG. 2, a diagram of several exemplary cache lines 200 are illustrated. Cache lines 200 are used to illustrate aspects of the disclosed cache line crossing (CLX) load techniques. As mentioned above, when an unaligned (i.e., a CLX) demand load is encountered by a prefetch unit, a determination is made as to whether an L1 cache hit or an L1 cache miss occurred for a first cache line of an allocated or confirmed unaligned stream. If the first cache line was a miss, microcode may be employed to handle the first cache line miss. In this case, after the microcode has run, both the first cache line and a second cache line are stored in the L1 cache. When the unaligned stream retries the CLX load a hit will occur, as contrasted with a miss. The prefetch unit detects the CLX load and allocates or confirms a CLX prefetch stream. The prefetch unit may determine a stream direction (i.e., ascending or descending) in a conventional manner. The prefetch unit shares the direction information with a reload control unit, which is responsible for fetching data from a lower level cache or main memory for prefetches and demand loads. The prefetch unit is also configured to prefetch cache lines to the L1 cache that will be encountered in a subsequent CLX access.

Assuming a 2-ahead cache line prefetch of ascending addresses and a set prediction mechanism that produces a set prediction hit (SETPhit) slot to select a proper associativity class, for ascending addresses a CLX demand load of cache line 'A' is (A/A+1 or A/B). Following a CLX prefetch confirmation of cache line 'A' (i.e., checking that a CLXL is established between cache lines 'A' and 'B'), a prefetch probe test is initiated on cache line 'A+2' (cache line 'C'). If SETPhit and a CLXL bit for cache line 'C' is asserted, cache line 'A+3' (cache line 'D') is already stored in the L1 cache. If SETPhit and CLXL bit is not asserted for cache line 'C', cache line 'A+3' (cache line 'D') is prefetched, and the SETPhit value is recorded and used to determine the reload slot (i.e., to select which way is used to store the reloaded data in the L1 cache). Cache line 'A+2' (cache line 'C') and cache line 'A+3' (cache line 'D') are linked when cache line 'A+3' (cache line 'D') is reloaded. If SETPhit is not asserted, cache line 'A+3' (cache line 'D') is prefetched, and a set provided by the replacement policy unit is used to determine the reload slot. In this case, cache line 'A+2' (cache line 'C') and cache line 'A+3' (cache line 'D') are not linked when cache line 'A+3' (cache line 'D') is reloaded (a CLXL may be established between cache lines 'D' and 'E' when cache line 'E' is reloaded), as cache line 'C' is not present in the L1 cache.

For descending addresses a CLX demand load of cache line 'D' is (D/D−1 or D/C). Assuming a 1-ahead cache line fetch of descending addresses cache line 'D−2' (cache line 'B') should be prefetched. In contrast with ascending addresses, for descending addresses the SETPhit value is stored if a CLXL bit for cache line 'D' is asserted, and the SETPhit value becomes the defacto reload slot for future prefetches. A prefetch probe test is performed on cache line D−2 (cache line 'B'). If SETPhit and CLXL bit is asserted for cache line 'C', the prefetch is complete as cache line 'B' is already present in the L1 cache. If SETPhit and CLXL bit is not asserted, cache line D−2 (cache line 'B') is prefetched, and the set indicated by SETPhit is used as the defacto reload slot by the reload control unit. In various embodiments, the CLXL bit for cache lines 'C' and 'B' is tested at reload time. If SETPhit is not asserted for a set, cache line 'B' is prefetched, and the replacement policy unit provides the set for the reload slot.

With reference to FIG. 3, a diagram of a relevant portion of several exemplary cache lines 300, that are used to illustrate aspects of the disclosed cache line crossing techniques for ascending addresses, are further illustrated. When a snoop or a store claims a cache line (in this case, cache line 'E'), a CLXL bit for cache line 'D' is deasserted. Similarly, when a non-CLX reload occurs for cache line 'C', CLXL bits for cache lines 'B' and 'C' are deasserted.

Figure 4:
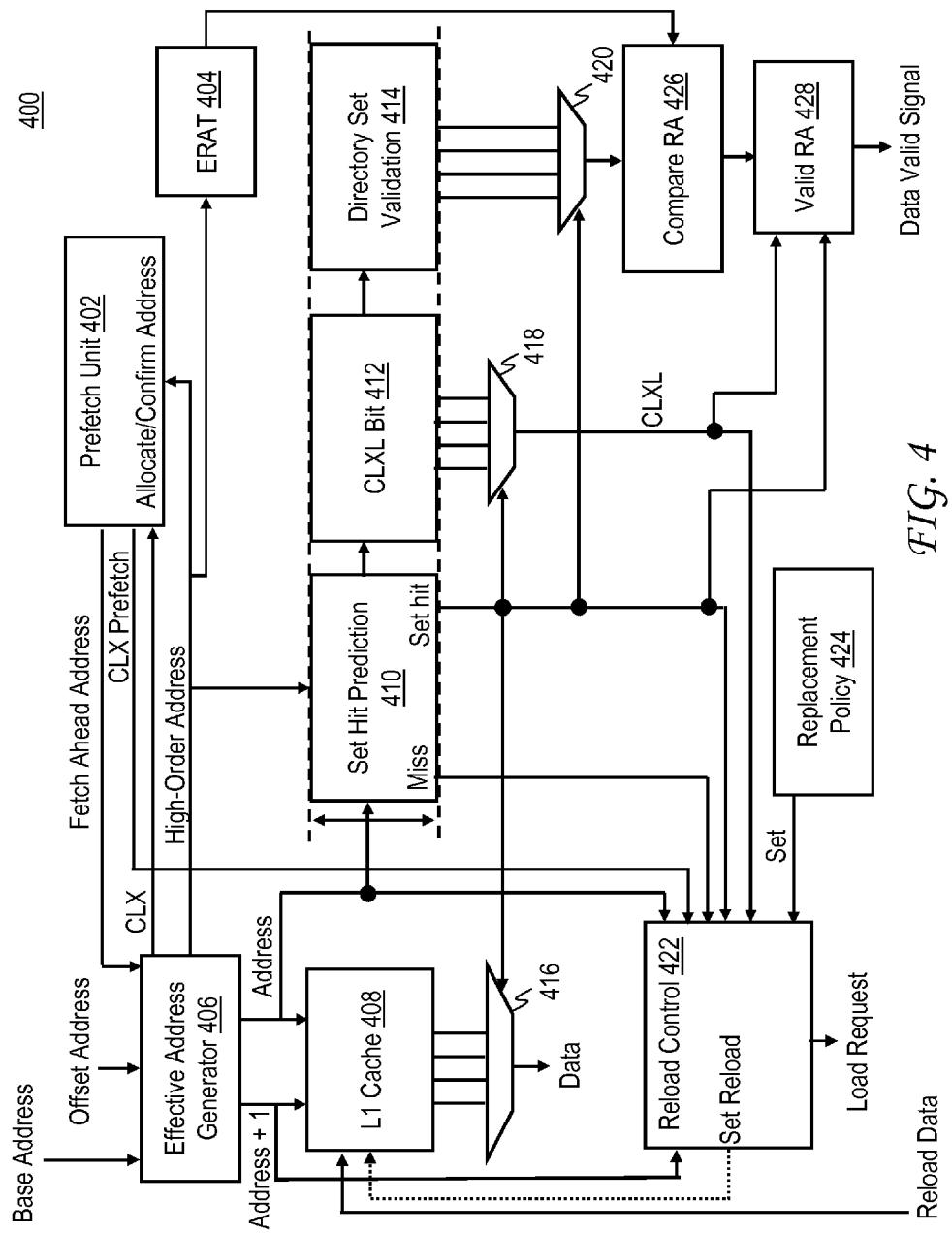
FIG. 4 is a diagram of a relevant portion of an exemplary level 1 (L1) cache that is configured according to one or more aspects of the present disclosure.

With reference to FIG. 4, a relevant portion of a load-store unit (LSU) 400 of processor 102 is illustrated that is configured, according to an embodiment of the present disclosure, to handle CLX loads. LSU 400 includes an effective address generator 406 that is configured to receive a base address and an optional offset address from an associated processor core and a fetch ahead address from prefetch unit 402. From these inputs, generator 406 generates two addresses (i.e., a first address (Address) and a second address (Address+/−1)) that are used to access data in L1 cache 408. Generator 406 also provides a higher-order address to prefetch unit 402, effective-to-real address translation (ERAT) unit 404, and set hit prediction unit 410. Responsive to the higher-order address, ERAT unit 404 provides a real address (RA) to an input of compare RA unit 426. As is discussed in further detail below, compare RA unit 426 is used for directory set validation. Data selected from L1 cache 408 is provided, via multiplexer 416, to an associated processor core for processing. The two addresses are also provided to reload control unit 422, which is configured to reload data requested from lower cache levels into an appropriate set of L1 cache 408 responsive to a CLX signal from prefetch unit 402, a miss signal from a set hit prediction unit 410, a set hit signal from set hit prediction unit 410 (or a set signal from a replacement policy unit 424), and a CLXL bit selected from a CLXL bit unit 412. The first address is also provided to set hit prediction unit 410, CLXL bit unit 412, and a directory set validation unit 414.

Set hit prediction unit 410 is configured to indicate whether a set hit or a miss occurred in response to a CLX load of the first address and also provides an indication of which set was hit, if any, in L1 cache 408. CLXL bit unit 412 provides a CLXL bit for each way of L1 cache 408. For example, assuming L1 cache 408 is a 4-way cache, CLXL bit unit 412 provides four CLXL bits (i.e., one CLXL bit for each way for the first address). Multiplexer 418 selects a CLXL bit (provided by CLXL bit unit 412) to provide to reload control unit 422 and valid real address (RA) unit 428. The set hit indication provided by set hit prediction unit 410 is used to select which input of multiplexers 416, 418, and 420 is provided at a respective output of multiplexers 416, 418, and 420.

Multiplexer 420 selects a real address from the addresses provided by directory set validation unit 414 to compare with a real address provided by ERAT unit 404. An output of compare RA unit 426 is coupled to an input of valid RA unit 428, which also receives a CLXL bit signal (selected by multiplexer 418) and a set hit signal (provided by set hit prediction unit 410). In response to a real address match, a set prediction hit, and an asserted CLXL bit, valid RA unit 428 provides a data valid signal to the associated processor core indicating that the data is valid.

Figure 5:
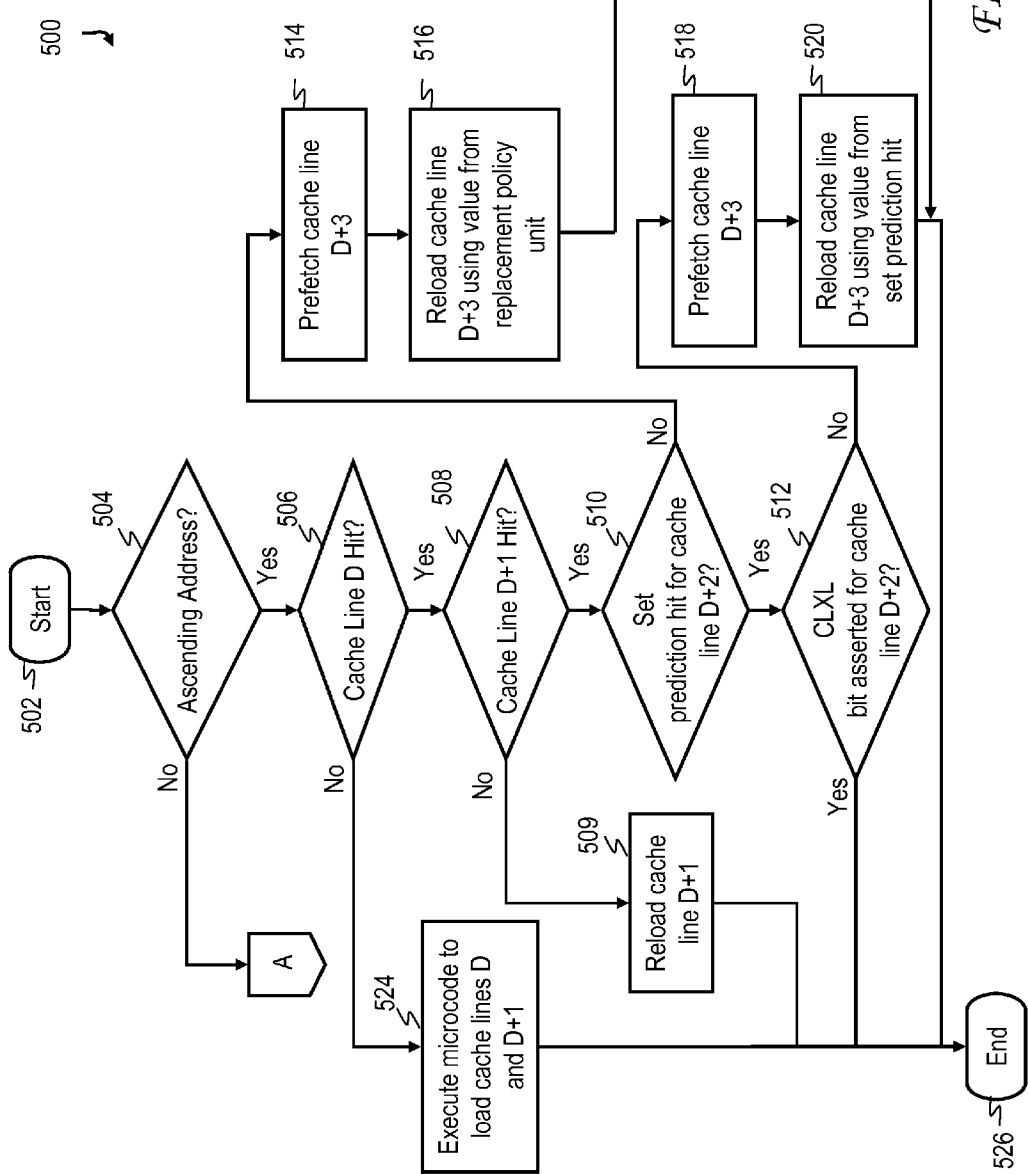
FIGS. 5 and 6 depict a flowchart of an exemplary process for implementing various cache line crossing load techniques according to one embodiment of the present disclosure.
Figure 6:
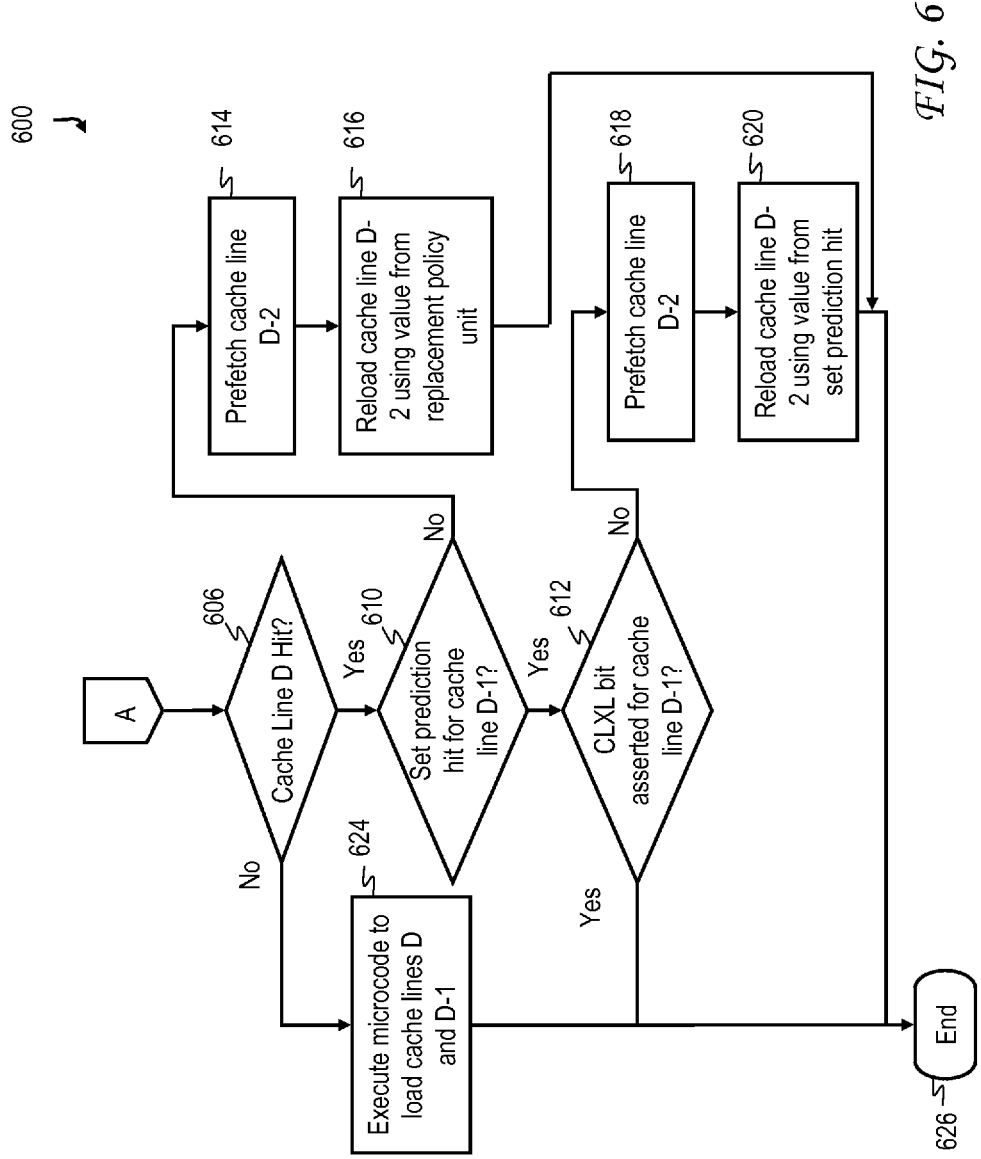

With reference to FIGS. 5 and 6, an exemplary process (separately labeled as processes 500 and 600 in FIGS. 5 and 6, respectively) for implementing various cache line crossing load techniques, according to one embodiment of the present disclosure, is illustrated. Process 500 initiates a 2-ahead prefetch for ascending addresses and a 1-ahead prefetch for descending addresses. Process 500 may be initiated in response to, for example, prefetch unit 402 detecting a cache line crossing (CLX) load for cache line 'D' in block 502 (see FIG. 5). Next, in decision block 504, prefetch unit 402 determines (e.g., in a conventional manner) whether addresses for an allocated/confirmed stream associated with the cache line 'D' are ascending or descending. In response to a determination at block 504 that addresses in the stream are ascending, control transfers to decision block 506. In block 506, prefetch unit 402 determines whether a cache line hit in L1 cache 408 occurred for a first cache line (labeled cache line 'D'). In response to a cache line miss in block 506, control transfers to block 524, where prefetch unit 402 initiates the execution of microcode to load cache lines 'D' and 'D+1' into L1 cache 408 and handle the CLX load in a conventional manner. Following block 524, control transfers to block 526 where the process 500 terminates until a next CLX load is detected.

In response to a determination at block 506 that the access to the first cache line (labeled cache line 'D') resulted in a hit in L1 cache 408, control transfers to decision block 508, where prefetch unit 402 determines whether a cache line hit occurred in L1 cache 408 for a second cache line in the stream (labeled as cache line 'D+1'). In response to a determination at block 508 that the access to the second cache line resulted in a miss in L1 cache 408, control transfers to block 509, where prefetch unit 402 directs reload control unit 422 to reload the second cache line and assert a CLXL bit for the first cache line. Following block 509 control transfers to block 526, where process 500 terminates.

Referring again to block 508, in response to a determination that the access to the second cache line resulted in a cache line hit in L1 cache 408, control transfers to decision block 510. In block 510 reload control unit 422 determines whether a set prediction hit occurred for a third cache line in the stream (labeled cache line 'D+2'), based on a set prediction hit indication provided by set hit prediction unit 410. In response to a set prediction miss for the third cache line in block 510, control transfers to decision block 514. In block 514 prefetch unit 402 directs reload control unit 422 to prefetch a fourth cache line (labeled cache line 'D+3'). Next, in block 516 reload control unit 422 reloads the fourth cache line into a set based on a value provided from replacement policy unit 424. Following block 516 control transfers to block 526 where process 500 terminates.

Figure 7:
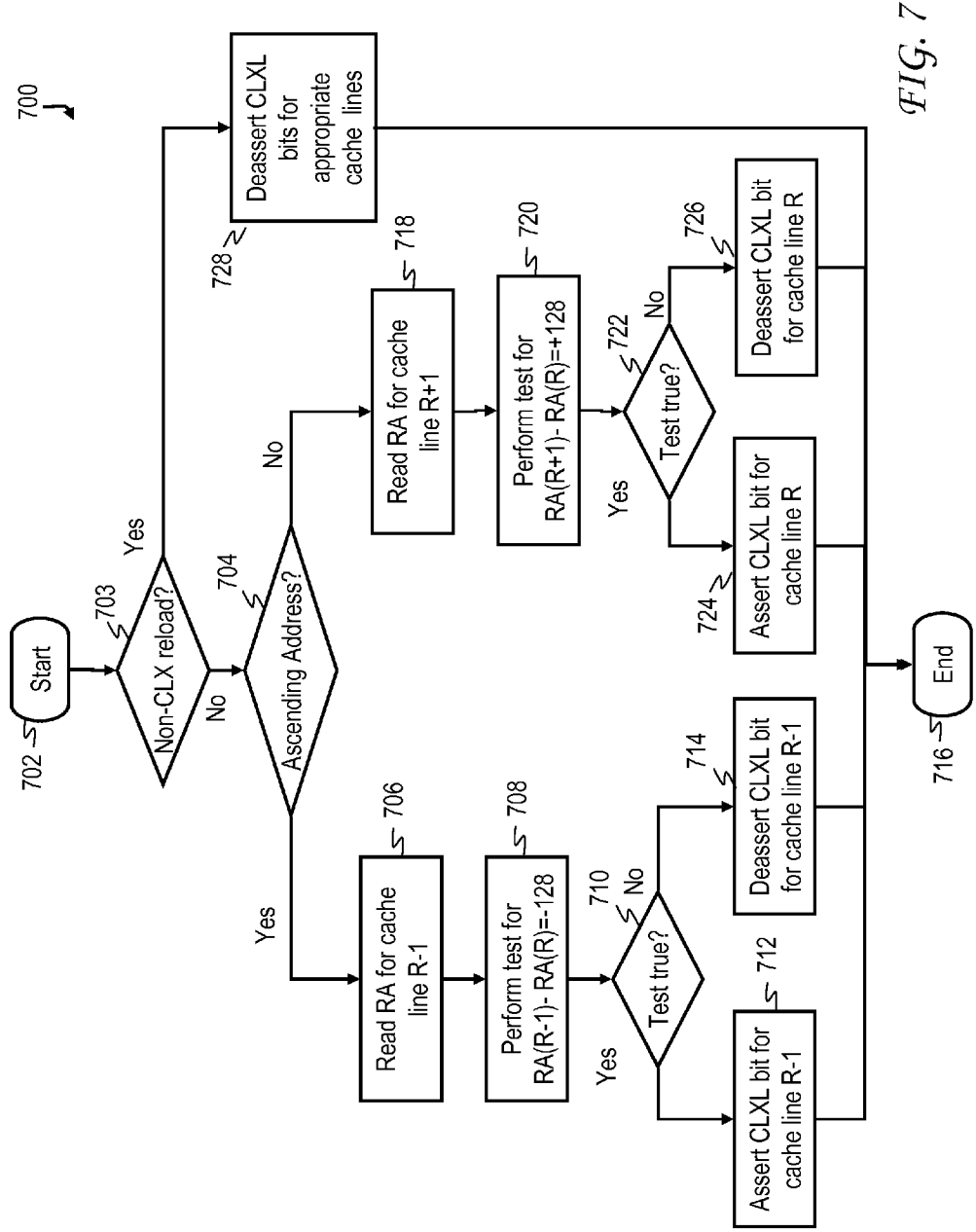
FIG. 7 is a flowchart of an exemplary process for asserting and deasserting a cache line crossing link (CLXL) indicator according to one embodiment of the present disclosure.

Referring again to block 510, in response to a set prediction hit for the third cache line (i.e., cache line 'D+2'), control transfers to decision block 512. In block 512 reload control unit 422 determines whether a CLXL bit (provided by CLXL bit unit 412) is asserted for the third cache line (i.e., cache line 'D+2'). In response to a determination in block 512 that the CLXL bit is asserted for the third cache line (i.e., cache line 'D+2'), control transfers to block 526 where process 500 terminates, as the fourth cache line (i.e., cache line 'D+3') is already stored in L1 cache 408. In response to a determination at block 512 that the CLXL bit is not asserted for the third cache line (i.e., cache line 'D+2'), control transfers to block 518. In block 518 prefetch unit 402 initiates prefetching of the fourth cache line (i.e., cache line 'D+3') by reload control unit 422. Next, in block 520, reload control unit 422 reloads the fourth cache line (i.e., cache line 'D+3') into a set of L1 cache 408 selected by a value provided by set hit prediction unit 410 and asserts the CLXL bit for the third cache line (i.e., cache line 'D+2') when the conditions in block 710 of FIG. 7 are true. Following block 520, process 500 terminates in block 526.

Returning to block 504, in response to a determination that addresses for an allocated/confirmed stream associated with the cache line 'D' are descending, control transfers through page connector A to decision block 606 (see FIG. 6). In block 606, prefetch unit 402 determines whether a cache line hit in L1 cache 408 occurred for a first cache line (i.e., cache line 'D'). In response to a determination at block 606 that the access for the first cache line resulted in a miss in L1 cache 408, control transfers to block 624, where prefetch unit 402 initiates the execution of microcode to load cache lines 'D' and 'D−1' into L1 cache 408 such that the CLX load is handled in a conventional manner. Following block 624, control transfers to block 626 where the process 600 terminates until a next CLX load is detected.

In response to a determination at block 606 that the access for the first cache line hit in L1 cache 408, control transfers to decision block 610, where reload control unit 422 determines whether a set prediction hit occurred for a second cache line in the stream (labeled cache line 'D−1'), based on a set prediction hit indication provided by set hit prediction unit 410. In response to a set prediction miss for the second cache line in block 610, control transfers to block 614. In block 614 prefetch unit 402 directs reload control unit 422 to prefetch a third cache line (labeled cache line 'D−2'). Next, in block 616 reload control unit 422 reloads the third cache line into a set selected by a value provided from replacement policy unit 424. Following block 616 control transfers to block 626 where process 600 terminates.

Returning to block 610, in response to a set prediction hit for the third cache line, control transfers to decision block 612. In block 612 reload control unit 422 determines whether a CLXL bit (provided by CLXL bit unit 412) is asserted for the second cache line. In response to a determination at block 612 that the CLXL bit is asserted for the second cache line, control transfers to block 626 where process 600 terminates, as the third cache line in the stream is already stored in L1 cache 408. In response to a determination at block 612 that the CLXL bit not asserted for the second cache line, control transfers to block 618. In block 618 prefetch unit 402 initiates prefetching of the third cache line (i.e., cache line 'D−2') by reload control unit 422. Next, in block 620 reload control unit 422 reloads the third cache line into a set of L1 cache 408 using a value provided by set hit prediction unit 410 and asserts the CLXL bit for the second cache line (i.e., cache line 'D−1') when the conditions in block 722 of FIG. 7 are true. Following block 620 process 600 terminates in block 626.

With reference to FIG. 7, a process 700 for asserting and deasserting cache line crossing link (CLXL) indicators in CLXL bit unit 412 is illustrated. Process 700 is initiated in response to, for example, receipt at reload control unit 422 of a cache line 'R' to be reloaded into L1 cache 408. Next, in decision block 703 reload control unit 422 determines whether the reload is a non-CLX reload. In response to a determination that the reload is a non-CLX reload, control transfers from block 703 to block 728. In block 728, reload control unit 422 deasserts CLXL bits for appropriate cache lines (i.e., the reloaded cache line 'R' and a cache line 'R+/−1' that may be linked to the reloaded cache line). Following block 728 control transfers to block 716 where process 700 terminates.

Returning to block 703, in response to a determination that the cache line to be reloaded into L1 cache 408 has been received as a CLX reload, control transfers from block 703 to decision block 704. In block 704, reload control unit 422 determines whether addresses for an associated stream are ascending or descending. In response to a determination at block 704 that the associated stream is formed of ascending addresses, control transfers to block 706. In block 706, reload control unit 422 reads a real address (RA) for cache line 'R−1'. Next, in block 708 reload control unit 422 performs a test for RA(R−1)−RA(R)=−128. It should be appreciated that this test is specific to implementations having 128-byte cache lines and, in other embodiments, would vary with cache line size. Next, in decision block 710, reload control unit 422 determines whether the test is true. If the test is true in block 710, control transfers to block 712 where reload control unit 422 asserts the CLXL bit for cache line 'R−1'. Following block 712 control transfers to block 716 where process 700 terminates. In response to a determination at block 710 that the test is not true, control transfers to block 714 where reload control unit 422 deasserts the CLXL bit for cache line 'R−1'. Following block 714 control transfers to block 716 where process 700 terminates.

Returning to block 704, in response to a determination at that the stream is formed of descending addresses, control transfers to block 718. In block 718 reload control unit 422 reads an RA for cache line 'R+1'. Next, in block 720 reload control unit 422 performs a test for RA(R+1)−RA(R)=+128. As above, it should be appreciated that the test is implementation-specific to embodiments having 128-byte cache lines. Next, in decision block 722, reload control unit 422 determines whether the test is true. In response to a determination at block 722 that the test is true, control transfers to block 724 where reload control unit 422 asserts the CLXL bit for cache line 'R'. Following block 722, control transfers to block 716 where process 700 terminates. In response to a determination at block 722 that the test is not true, control transfers to block 726 where reload control unit 422 deasserts the CLXL bit for cache line 'R'. Following block 726, control transfers to block 716 where process 700 terminates.

Accordingly, techniques have been disclosed herein that advantageously handle cache line crossing (CLX) loads for a cache system in an efficient and fast manner.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of handling an unaligned load operation, comprising:
   detecting, at a cache, a cache line crossing load operation that is associated with a first cache line and a second cache line;

in response to the cache including the first cache line but not including the second cache line, reloading the second cache line in the cache in a same set as the first cache line; and in response to reloading the second cache line in the cache, asserting a cache line crossing link indicator that is associated with the first cache line when an unaligned load miss occurred for the second cache line to indicate that both the first and second cache lines include portions of a desired data element.

2. The method of claim 1, further comprising:

detecting, using set hit prediction unit, at prefetch stream allocation whether a set in the cache was hit;

in response to detecting that a set in the cache was hit, notifying a reload control unit to utilize the set indicated by the set hit for reloading the second cache line into the cache; and in response to not detecting that a set in the cache was hit, notifying the reload control unit to utilize a set indicated by a replacement policy unit for reloading the second cache line into the cache.

3. The method of claim 1, wherein the cache is a level 1 (L1) cache.

4. The method of claim 1, wherein the cache only stores data.

5. The method of claim 1, wherein the cache stoics data and instructions.

6. The method of claim 1, further comprising:

verifying the first cache line is still present in the cache prior to asserting the cache line crossing link indictor that is associated with the first cache line.

\* \* \* \* \*